United States Patent [19]
Sukigara et al.

[11] Patent Number: 4,696,439
[45] Date of Patent: Sep. 29, 1987

[54] TAPE SPEED AND TENSION CONTROL SYSTEM FOR A MAGNETIC TAPE CASSETTE APPARATUS

[75] Inventors: Motoyuki Sukigara, Tokyo; Kazuhiko Yasuda, Fussa, both of Japan

[73] Assignee: Teac Corporation, Tokyo, Japan

[21] Appl. No.: 850,757

[22] Filed: Apr. 11, 1986

[30] Foreign Application Priority Data

Apr. 12, 1985 [JP] Japan .................................. 60-78063

[51] Int. Cl.$^4$ ...................... G11B 15/32; G11B 15/46; G11B 15/54
[52] U.S. Cl. .................................. 242/186; 242/75.51; 242/189; 242/191; 360/73
[58] Field of Search ................ 242/179, 184, 186–191, 242/75.51; 360/71, 73, 74.1–74.4, 96.1–96.5; 318/6, 7

[56] References Cited

U.S. PATENT DOCUMENTS

| | | | |
|---|---|---|---|
| 3,584,805 | 6/1971 | Lee ...................................... | 242/184 |
| 3,819,128 | 6/1974 | Hori et al. ............................ | 242/189 |
| 4,163,532 | 8/1979 | Sakai .................................... | 242/186 |
| 4,213,583 | 7/1980 | Mitani et al. ........................ | 242/186 |
| 4,370,683 | 1/1983 | Greig et al. .......................... | 360/73 |
| 4,442,985 | 4/1984 | Kishi et al. ........................... | 242/186 |
| 4,561,608 | 12/1985 | O'Gwynn et al. ................... | 360/74.1 X |

Primary Examiner—John Petrakes
Attorney, Agent, or Firm—Woodcock Washburn Kurtz MacKiewicz & Norris

[57] ABSTRACT

A digital tape cassette apparatus having a speed sensing roller in frictional contact with the magnetic tape within a cassette housing at a point intermediate the magnetic head and that one of the cassette hubs operating as the takeup hub during forward tape transportation. Utilizing a tape speed signal generated by a speed sensor driven by the speed sensing roller, a closed loop servomechanism controls a pair of drive motors coupled directly to the respective cassette hubs to afford constant tape speed. The servomechanism is associated with a tape tension control circuit whereby a supply side one of the drive motors during tape travel in either direction is energized to an extent increasing with the increase in the diameter of the tape reel on the takeup side hub, thereby affording constant tape tension. A reverse tape tension drop circuit is connected to the tape tension control circuit for making the tape tension less during reverse tape travel than during forward tape travel under the condition of the same tape reel diameter on the takeup side cassette hub, so that the tape tension at the magnetic tape is rendered approximately the same during forward and reverse tape travels despite the dynamically asymmetrical tape path due to the speed sensing roller in frictional engagement with the tape.

7 Claims, 4 Drawing Figures

TAPE SPEED AND TENSION CONTROL SYSTEM FOR A MAGNETIC TAPE CASSETTE APPARATUS

BACKGROUND OF THE INVENTION

Our invention relates to magnetic tape transports, particularly to those for use with a magnetic tape cassette wherein a length of magnetic tape travels between a pair of independently rotatable hubs or reels within a generally boxlike housing. More particularly, our invention concerns a tape speed and tension control system in a magnetic tape cassette apparatus well adapted for the reading and/or writing of data in digitized form. The magnetic tape speed and tension control system of our invention incorporates improvements of the tape transport described and claimed in U.S. Pat. No. 4,163,532 issued to Sakai and assigned to the assignee of our instant application.

The noted Sakai patent suggests a tape speed control servomechanism having a speed sensing roller in frictional engagement with the tape through a prescribed one of a series of apertures defined conventionally in the cassette housing. The servomechanism measures the actual traveling speed of the tape by the speed sensing roller and controls a pair of drive motors, coupled one to each hub of the tape cassette, for constant tape speed. The speed sensing roller engages the tape through that one of the apertures which is located closest to that one of the cassette hubs which operates as the takeup hub during tape travel in a predetermined forward direction. The magnetic head of the apparatus engages the tape through the central one of the apertures.

Sakai's tape speed control servomechanism is associated with a tape tension control circuit whereby a supply side one of the cassette hubs during tape travel in either direction is energized to a varying extent necessary for constant tape tension. The tape tension control circuit has been so designed as to realize the same tape tension at the speed sensing roller during tape travels in both forward and reverse directions. However, the hub to hub tape path defined by the prior art apparatus is dynamically asymmetrical because of the offset arrangement of the speed sensing roller in frictional engagement with the tape. Consequently, according to Sakai's tension control, the tape tension at the magnetic head, located at the midpoint of the tape path between the two cassette hubs, has been greater during reverse tape travel than during forward tape travel.

We must point out that such unequal tape tensions at the magnetic head during forward and reverse tape transportations present no problem at all at the conventional tape speed. The higher tape tension during reverse tape run has incurred no rapid wear of the magnetic head.

The current trend in the information processing art, however, is toward greater capacities of all forms of storage media. It has recently been proposed to increase the storage capacity of magnetic tape cassettes to six times as much as heretofore. This requires higher tape tensions for proper data transfer contact between tape and head. In that case, if Sakai's tension control system were used for higher tape tensions, the tape tension during reverse tape travel would become inordinately high, possibly resulting in the rapid wear and inconveniently shorter useful life of the magnetic head.

SUMMARY OF THE INVENTION

We have hereby found out how to assure, in a magnetic tape cassette apparatus of the type defined, proper tape tension during both forward and reverse tape transportations and hence to adapt the apparatus for higher density data transfer with the tape than heretofore.

Our invention is directed to a data transfer apparatus for use with a magnetic tape cassette of, typically, the universal Philips type having a length of magnetic tape which extends between a pair of hubs within a housing and which is partly exposed through a series of apertures in the front edge of the cassette housing. The apparatus has a magnetic head, such as a read/write head, for relative sliding contact with the tape through a centrally located one of the apertures.

More specifically, our invention pertains to a tape transport and tape speed and tension control system for the above defined apparatus, including first and second variable speed drive motors for driving the first and second hubs, respectively, of the tape cassette. A speed sensing roller is arranged for frictional engagement with the tape through another of the cassette apertures which is closer to the second cassette hub (operating as the takeup hub during forward tape travel) than to the first cassette hub. Driven by this speed sensing roller, a speed sensor circuit generates an electric tape speed signal representative of actual tape speed. A motor drive circuit is connected to the speed sensor circuit and responds to the tape speed signal for putting out a motor drive signal for constant tape speed during tape travel in either direction. The motor drive signal is directed to a takeup side one of the drive motors during tape travel in either direction, that is, to the first drive motor during reverse tape travel and to the second drive motor during forward tape travel.

Also included is a tape tension control circuit for generating a tape tension signal in response to a tape reel diameter signal indicative of the increasing diameter of the tape reel on a takeup side one of the cassette hubs during tape travel in either direction, the tape tension signal increasing in magnitude with the increase in the diameter of the tape reel on the takeup side one of the cassette hubs. The tape tension signal is applied to a supply side one of the drive motors during tape travel in either direction, that is, to the first drive motor during forward tape travel and to the second drive motor during reverse tape travel. When applied with the tape tension signal of increasing magnitude, the supply side drive motor is energized for the exertion of correspondingly increasing tension on the tape. The tape tension control circuit is provided with reverse tape tension drop means for lessening the magnitude of the tape tension signal to a predetermined degree during reverse tape travel in comparison with that during forward tape travel under the condition of the same diameter of the tape reel or amount on a takeup side one of the cassette hubs.

The reverse tape tension drop means is easy to realize. In a preferred embodiment it comprises a transistor connected to the tape tension control circuit via a resistor. The transistor becomes conductive or nonconductive depending upon whether the tape transport is conditioned for forward or reverse tape travel, and coacts with the resistor to make the tape tension less during reverse tape travel than during forward tape travel. Therefore, in the face of the asymmetrical tape path, the tape tension is made substantially the same at the tape portion in contact the magnetic head during tape transportation in both directions. We have thus succeeded in avoiding the rapid wear of the magnetic head from excessive tape tension during reverse tape travel.

The above and other features and advantages of our invention and the manner of realizing them will become more apparent, and the invention itself will best be understood, from a study of the following description and appended claims, with reference had to the attached drawings showing a preferred embodiment of our invention.

DESCRIPTION OF THE PREFERRED EMBODIMENT

Figure 1:
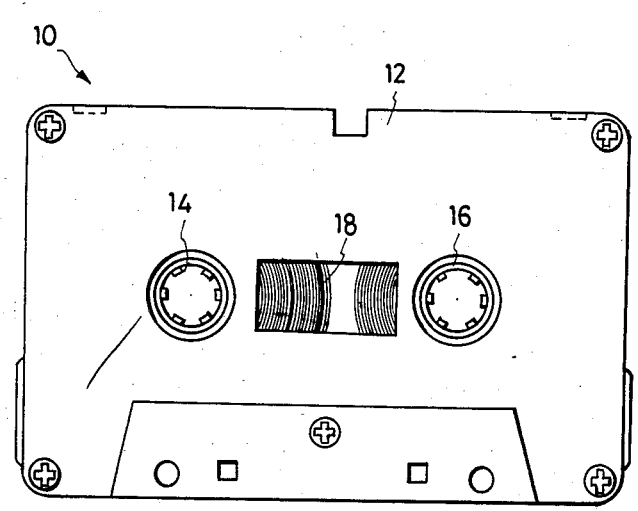
FIG. 1 is a plan view of a typical magnetic tape cassette for use with the tape transport and tape speed and tension control system of our invention.

We will now describe our invention in detail as embodied in the digital tape cassette apparatus of the type disclosed in the aforementioned Sakai U.S. Pat. No. 4,163,532. The apparatus is intended for use with the magnetic tape cassette of the familiar Philips type shown in FIGS. 1 and 2. Generally designated 10, the tape cassette has a generally flat, boxlike housing 12 within which a pair of internally toothed hubs or reels 14 and 16 are supported for independent rotation about respective axes in parallel spaced relation to each other. A length of magnetic tape 18 is wound at least in part about the hubs 14 and 16 and has its opposite extremities anchored thereto.

Figure 2:
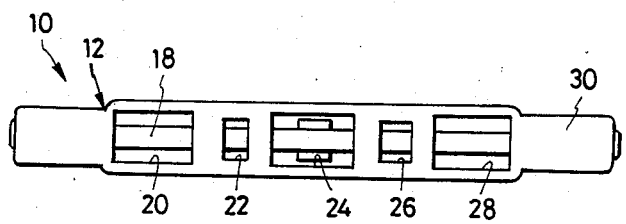
FIG. 2 is a front edge elevation of the tape cassette of FIG. 1.

FIG. 2 indicates that the cassette housing 12 has a series of apertures 20, 22, 24, 26 and 28 defined in its front edge 30 to expose parts of the magnetic tape 18 as the latter travels between the hubs 14 and 16 along a predetermined path within the housing 12. The apertures 20 and 28 seen at the extreme left and right in FIGS. 2 have originally been intended for the engagement of the tape 18 with a pinch roller in the more conventional capstan drive type tape transport. However, in the tape cassette apparatus hereinafter described, the extreme right hand aperture 28 is utilized for the frictional contact of the tape 18 with the speed sensing roller to be set forth subsequently. The central aperture 24 is for the establishment of data transfer contact between the tape 18 and the magnetic head also to be referred to presently. The other two apertures 22 and 26 may be used for optically sensing the beginning and end of the tape 18, as has been known heretofore.

Figure 3:
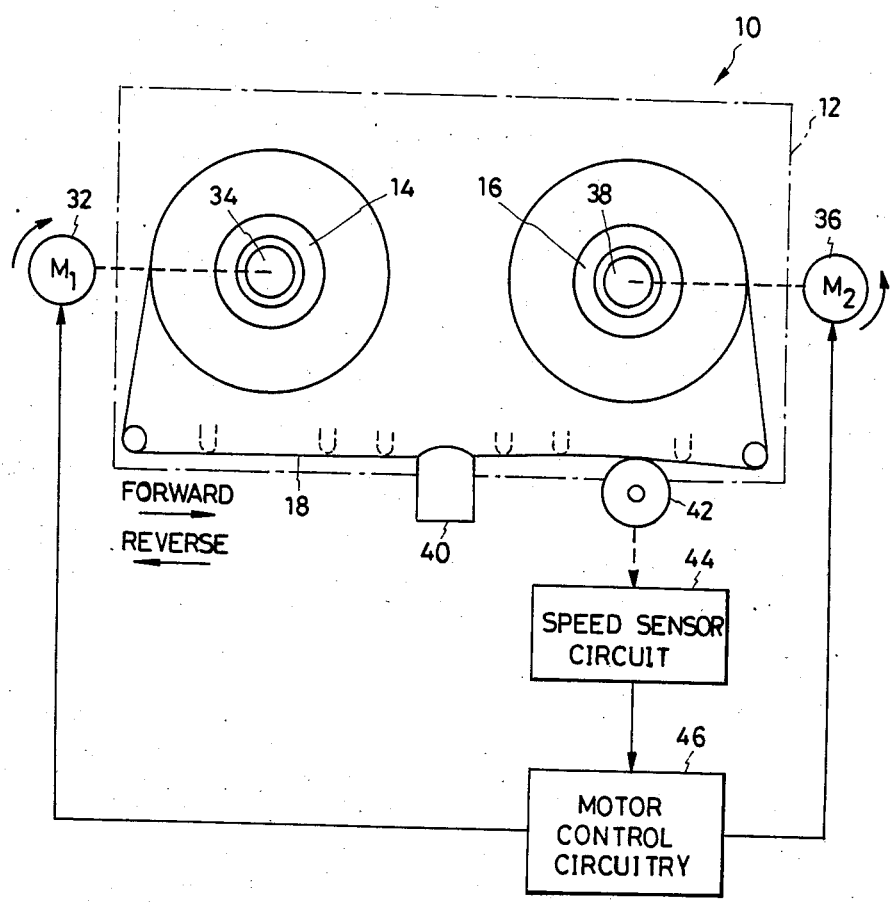
FIG. 3 is a diagrammatic illustration of the positional relationship between the tape cassette of FIGS. 1 and 2, mounted in place on the data transfer apparatus for use therewith, and the speed sensing roller, magnetic head, etc., of the apparatus, the diagram being also explanatory of the way in which the pair of drive motors of the apparatus are controlled for tape transportation from hub to hub.

In FIG. 3 we have shown the magnetic tape cassette 10 in proper positional relationship with some pertinent parts of the data transfer apparatus for use therewith.

The apparatus has a first variable speed drive motor 32, preferably a direct current motor, having an output shaft 34 extending into the first hub 14 of the tape cassette 10 for positive driving engagement therewith. A second variable speed drive motor 36 likewise has its output shaft 38 extending into the second hub 16 of the tape cassette 10 for positive driving engagement therewith.

FIG. 3 also illustrates the magnetic head 40 and speed sensing roller 42, intruding into the cassette housing 12 through its central aperture 24 and extreme right hand end aperture 28, respectively. It will be noted that the extreme right hand end aperture 28 is located closer to the second cassette hub 16 than is any other aperture in the front edge 30 of the cassette housing 12. The magnetic head 40 and speed sensing roller 42 intrude into the cassette housing 12 to extents that are determined for optimum data transfer contact and speed sensing contact, respectively, with the tape 18, as are described more fully in the noted Sakai U.S. Pat. No. 4,163,532.

The speed sensing roller 42 is drivingly connected to a speed sensor circuit 44. This circuit creates an electric tape speed signal having a voltage representative of the actual speed of the tape 18.

Figure 4:
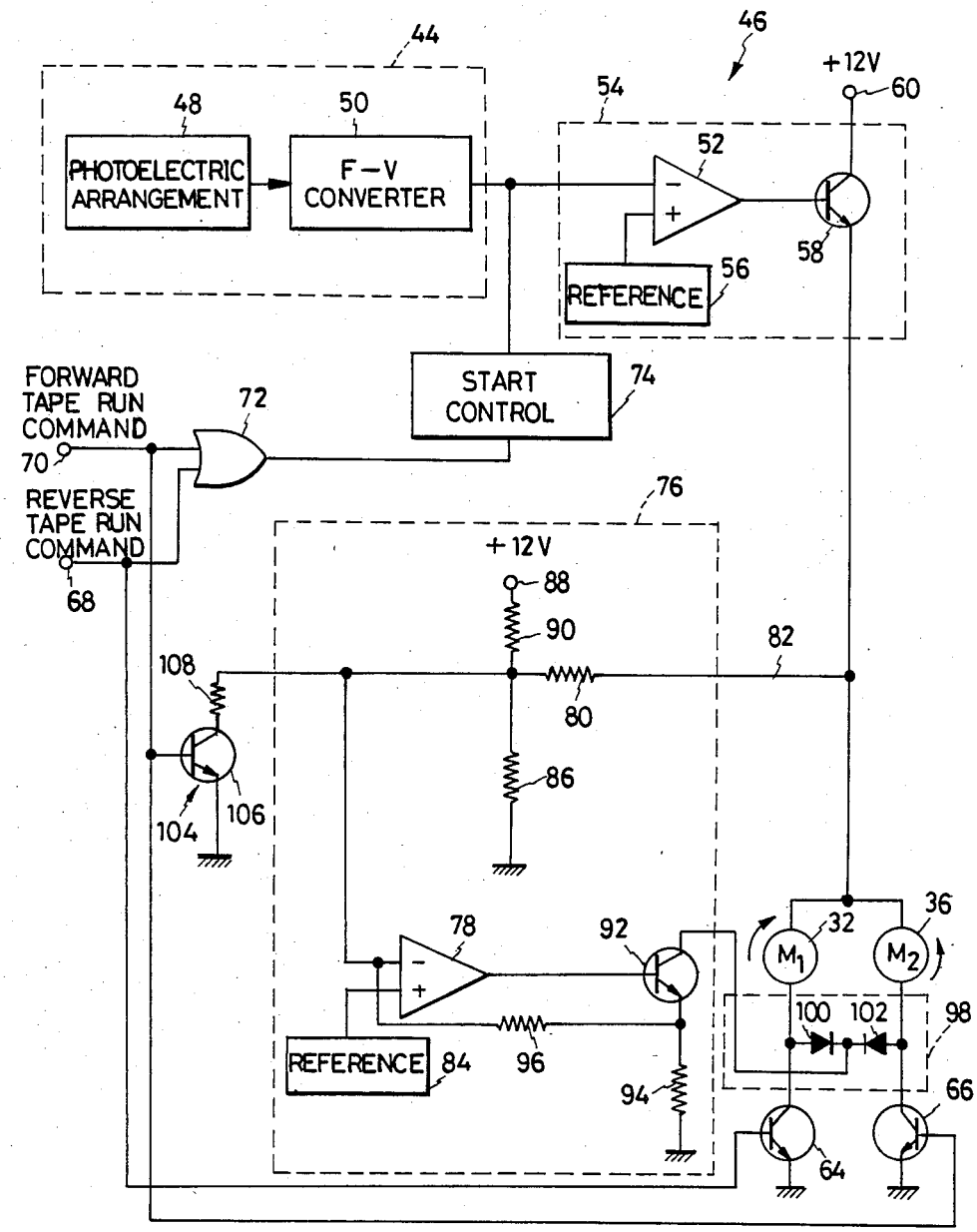
FIG. 4 is a combined block and schematic electrical diagram of the motor control circuitry incorporated in the tape cassette apparatus in accordance with the novel concepts of our invention.

The speed sensor circuit 44 has its output connected to a motor control circuitry 46 given in block form in FIG. 3 and illustrated in detail in FIG. 4, to which latter figure we will refer presently. The motor control circuitry 46 responds to the tape speed signal for energizing the drive motors 32 and 36 in a manner to effectuate tape transportation at controlled speed and, in accordance with our invention, under controlled tension.

For tape travel in a predetermined forward direction, indicated by the arrow in FIG. 3, the second drive motor 36 is to be driven in a counterclockwise direction. The first drive motor 32 is to be energized in a clockwise direction during such forward tape travel to impart tension to the tape 18 as the latter travels from the first 14 to second 16 cassette hub. For tape travel in a predetermined reverse direction, on the other hand, the first drive motor 32 is to be driven clockwise. The second drive motor 36 is to be energized counterclockwise to impart tension to the tape 18 as the latter travels from the second 16 to first 14 cassette hub.

During such tape travel in either direction, the speed sensing roller 42 will rotate at the same circumferential speed therewith. Driven by the roller 42, the speed sensor circuit 44 will generate the tape speed signal representative of the actual tape speed.

We will now refer to FIG. 4 for a full discussion of the motor control circuitry 46 incorporating the improved tape tension control scheme of our invention. This diagram includes a slightly more detailed representation of the speed sensor circuit 44. It includes a conventional photoelectric arrangement 48 driven by the speed sensing roller 42 for generating an electric signal having a frequency or pulse repetition rate representative of the actual tape speed. The photoelectric arrangement 48 is connected to a frequency to voltage (F-V) converter 50, also inluded in the speed sensor circuit 44, whereby there is created the tape speed signal having a voltage corresponding to the actual tape speed.

The output of the F-V converter 50, or of the speed sensor circuit 44, is connected to the inverting input of a differential amplifier 52 included in a motor drive circuit 54. A reference voltage source 56 is connected to the noninverting input of the differential amplifier 52 to supply thereto a reference voltage representative of the desired tape speed. Thus the differential amplifier 52 puts out a voltage indicative of the difference between the two input voltages representative of the actual and desired tape speeds.

The output of the differential amplifier 52 is connected to the base of an amplifying transistor 58 also included in the motor drive circuit 54. The amplifying transistor 58 has its collector connected to a +12 volt supply terminal 60, and its emitter to a parallel connection of the two drive motors 32 and 36 by way of a line 62. The collector emitter resistance of the amplifying transistor 58 varies in step with the change in the output voltage of the speed sensor circuit 44 and, in consequence, of the differential amplifier 52.

As is apparent from the foregoing, the motor control circuitry 46 includes a closed loop, two motor servomechanism comprising the speed sensing roller 42, speed sensor circuit 44, motor drive circuit 54, drive motors 32 and 36, and magnetic tape 18 extending between the cassette hubs 14 and 16 driven by the respective drive motors. The two drive motors 32 and 36 are energized by the variable servo output voltage supplied through the line 62 to effect tape transportation at constant speed. We will therefore refer to this line 62 as the servo output line.

Connected to the common servo output line 62 on one hand, the first 32 and second 36 drive motors are, on the other hand, grounded via first 64 and second 66 switching transistors respectively. The first switching transistor 64 has its base connected to a reverse tape run command terminal 68. The second switching transistor 66 has its base connected to a forward tape run command terminal 70. The reverse and forward tape run command signals supplied through these terminals 68 and 70 are of binary nature, each consisting of a high level tape run start command and a low level tape run stop command. The switching transistors 64 and 66 respond to these tape run commands, causing the first drive motor 32 to be energized with the servo output voltage when the reverse tape run command signal goes high, and the second drive motor 36 to be energized with the servo output voltage when the forward tape run command signal goes high.

Further the tape run command terminals 68 and 70 are both conventionally connected to an OR gate 72 and thence to a start control circuit 74. Having its output connected to the inverting input of the differential amplifier 52, the start control circuit 74 functions in a known manner to prevent any abrupt rise of the servo output voltage at the start of tape travel in either direction.

Closely associated with the tape speed control servomechanism is a tape tension control circuit, generally designated 76, for applying a tape tension voltage, derived from the servo output or motor drive voltage, to a supply side one of the drive motors 32 and 36 during tape travel in either direction and hence for holding the traveling magnetic tape 18 under controlled tension. The tape tension control circuit 76 includes a differential amplifier 78 having an inverting input connected via a resistor 80 to the servo output line 62 by way of a line 82, and a noninverting input connected to a reference voltage source 84. A voltage dividing resistor 86 is connected between the inverting input of the differential amplifier 78 and the ground. The inverting input of the differential amplifier 78 is further connected to a +12 volt supply terminal 88 via a resistor 90.

The output of the differential amplifier 78 is connected to the base of a tape tension control transistor 92, also included in the tape tension control circuit 76, which operates as a variable impedance element for varying the tape tension voltage across a supply side one of the drive motors 32 and 36. The impedance offered by this transistor 92 is inversely proportional to the output voltage of the differential amplifier 78. The tape tension control transistor 92 has its emitter grounded via a resistor 94, besides being connected to the inverting input of the differential amplifier 78 via a feedback resistor 96.

The collector of the tape tension control transistor 92 is connected to the drive motors 32 and 36 via a switching diode circuit 98 whereby either of the drive motors is grounded via the tape tension control transistor 92 and resistor 94, for the application of the controlled tape tension voltage to the supply side motor, depending upon the direction of tape travel. The switching diode circuit 98 comprises first 100 and second 102 diodes having their anodes connected to the first 32 and second 36 drive motors, respectively. The cathodes of these diodes are both connected to the tape tension control transistor 92.

We have generally indicated by the numeral 104 a reverse tape tension drop circuit constituting a feature of our invention. It includes a reverse tape tension drop transistor 106 having its base connected to the forward tape run command terminal 72. The emitter of the transistor 106 is grounded, and its collector is connected to the inverting input of the differential amplifier 78 of the tape tension control circuit 76 via a resistor 108. Therefore, during forward tape travel, the reverse tape tension drop transistor 106 functions to ground the inverting input of the differential amplifier 78 via the resistor 108.

OPERATION

Let us assume that the forward tape run command signal supplied through the terminal 70 has gone high. Then the second switching transistor 66 will become conductive, causing the second drive motor 36 to be energized from the motor drive circuit 54. Revolving in the arrow marked direction, the second drive motor 36 will cause the magnetic tape 18 of the tape cassette 10 to travel forwardly from hub 14 to hub 16. As the speed sensing roller 42 rotates in frictional engagement with the traveling tape 18, the speed sensor circuit 44 will generate a tape speed voltage indicative of the actual tape speed. The differential amplifier 52 of the motor drive circuit 54 will put out a voltage proportional to the difference between the tape speed voltage and the reference voltage from the source 56.

If the tape speed voltage rises during such forward tape travel owing to an increase in the actual tape speed, the output voltage of the differential amplifier 52 will drop correspondingly, resulting in an increase in the impedance of the amplifying transistor 58. The increased impedance of the amplifying transistor 58 will cause a decrease in the motor drive voltage impressed to the second drive motor 36 by way of the servo output line 62. Then the speed of the second drive motor 36 will drop until the actual tape speed becomes equal to the desired speed as represented by the reference voltage from the source 56.

With the progress of the forward tape transportation, the diameter of the tape reel or amount on the takeup side hub 16 will increase gradually. Therefore, if the second drive motor 36 were driven at the same speed despite such gradual increase in the diameter of the tape reel on the takeup side hub 16, the traveling speed of the tape 18 would rise. Actually, however, the motor drive voltage decreases in step with the increase in the tape reel diameter on the takeup side hub 16. It is thus seen that the decreasing motor drive voltage (servo output voltage) represents the increasing tape reel diameter on the takeup side hub, if we disregard the unavoidable voltage fluctuations. We might therefore call the motor drive voltage a tape reel diameter signal as well.

It is to utilize this tape reel diameter signal for tape tension control that the tape tension control circuit 76 is connected to the servo output line 62 by way of the line 82. For, as will be understood, the gradual increase in the tape reel diameter on the takeup side hub 16 necessitates a corresponding increase in tape tension.

Since the second switching transistor 24 conducts during forward tape travel, the second diode 102 is nonconductive as its anode is approximately at ground potential. The first diode 100 is conductive, however, so that a current will flow through the circuit comprising the first drive motor 32, first diode 100, tension control transistor 92 and resistor 94, resulting in the energization of the first drive motor with the tape tensionn voltage. The tape tension voltage is so low that the energization of the first drive motor 32 during forward tape travel serves merely for the exertion of tension on the tape 18 traveling from first hub 14 to second hub 16.

Besides being fed to the drive motors 32 and 36, the motor drive voltage is directed as the required tape reel diameter signal to the tape tension control circuit 76. After being voltage divided, the tape reel diameter signal is impressed to the inverting input of the differential amplifier 78, thereby to be compared with the reference voltage from the source 84. The resulting output from the differential amplifier 78 is applied to the base of the tension control transistor 92 for controlling its impedance.

The output voltage of the differential amplifier 78 will increase with a decrease in the servo output voltage due to the increase in the tape reel diameter on the takeup side hub 16 or to instantaneous fluctuations. The increased output voltage of the differential amplifier 78 will cause a decrease in the impedance of the tension control transistor 92 and, consequently, an increase in the tape tension voltage.

Further, during forward tape travel, the transistor 106 of the reverse tape tension drop circuit 104 is held conductive by the forward tape run command signal from the terminal 70. The resistor 37 of this reverse tape tension drop circuit is electrically in parallel with the voltage dividing resistor 86. The voltage impressed to the inverting input of the differential amplifier 78 is therefore lower than if the reverse tape tension drop transistor 106 is nonconductive. Thus the tape tension is generally higher during forward tape travel than during reverse tape travel.

As will be agreed by the tape transport specialists, it is very difficult to maintain the magnetic tape under constant tension throughout the complete process of tape transportation from one hub to the other. The tension will vary with the tape reel diameters, but not to such an extent as to affect reading or writing to any appreciable degree.

We will now proceed to the discussion of operation during reverse tape travel. As the reverse tape run command signal goes high, the first switching transistor 64 will conduct to cause the application of the motor drive voltage to the first drive motor 32. With the rotation of this first drive motor in the arrow marked direction, the tape 18 will travel reversely, from second hub 16 back to first hub 14. The closed loop servomechanism will operate just as during forward tape travel to hold the tape 18 at constant speed.

The second diode 102 of the switching diode circuit 98 is conductive, and the first diode 100 nonconductive, during reverse tape travel. Accordingly, the tape tension voltage will be impressed to the second drive motor 36 through the circuit comprising the second diode 102, tension control transistor 92 and resistor 41. The tape tension voltage will vary largely as during forward tape travel to hold the tape 18 under substantially constant tension in spite of the varying diameters of the tape reels on the hubs 14 and 16.

The reverse tape tension drop transistor 106 is nonconductive during reverse tape travel as the forward tape run command signal is then low. Thus, even if the motor drive voltage or tape reel diameter signal magnitude is the same, the voltage applied to the inverting input of the differential amplifier 78 will be greater during reverse tape travel than during forward tape travel. As the resulting output from the differential amplifier 78 will be lower, the impedance of the tension control transistor 92 will be higher. We have thus made the tape tension signal smaller in magnitude during reverse tape travel than during forward tape travel under the condition of the same tape reel diameter on a takeup side one of the cassette hubs 14 and 16.

As will be apparent from a study of FIG. 3, the speed sensing roller 42 frictionally engages the tape 18 so as to increase the tape tension at the magnetic head 40 during reverse tape travel. Consequently, even though the tape tension voltage is generally less during reverse tape travel, the tape tension at the magnetic head 40 is approximately the same regardless of the direction of tape transportation. It will therefore be understood that the reverse tape tension drop circuit 104 serves to compensate for the dynamically asymmetrical tape path due to the offset arrangement of the speed sensing roller 42. With the tape tension voltage reduced as above during reverse tape travel, the tape tension at the magnetic head 40 will not rise to such an extent as to cause rapid wear of the head even if the apparatus is put to high density data transfer with the tape cassette 10. The generally higher tape tension required for such high density data transfer will serve for the establishment of more favorable frictional engagement of the speed sensing roller 12 with the tape 18.

Although we have shown and described our invention in terms of but one preferable embodiment thereof, we recognize, of course, that our invention could be embodied in other forms within the broad teaching hereof. The following is a brief list of possible modifications or changes of the illustrated embodiment that will readily occur to one skilled in the art without departing from the scope of our invention:

1. The tape tension voltage could be reduced during reverse tape travel by changing the reference voltage applied to the differential amplifier 78.
2. The tape reel diameter signal could be derived from sources other than the servo output voltage, such as the number of revolutions of the drive motor 32 or 36 per unit length of time, or the current flowing through the takeup side one of these motors.

3. The reverse tape tension drop transistor 106 could be switched by the inversion of the reverse tape run command signal.
4. The tape tension voltage might be applied in the form of pulses having a high repetition rate.
5. The tape speed control servomechanism could incorporate a variety of feedback loops.

We claim:

1. In an apparatus for use with a magnetic tape cassette of the type having a length of magnetic tape which extends between first and second hubs within a housing for travel in both forward (from the first to the second hub) and reverse (from the second to the first hub) directions and which is partly exposed through a series of apertures defined in the front edge of the cassette housing, the apparatus including a magnetic head for relative sliding contact with the tape of the tape cassette through a centrally located one of the apertures in the cassette housing, a tape transport and tape speed and tension control system comprising:
   (a) a first variable speed drive motor for driving the first cassette hub;
   (b) a second variable speed drive motor for driving the second cassette hub;
   (c) a speed sensing roller arranged for frictional engagement with the tape through another of the apertures in the cassette housing which is closer to the second cassette hub than to the first cassette hub;
   (d) a speed sensor circuit driven by the speed sensing roller for generating an electric tape speed signal representative of actual tape speed;
   (e) a motor drive circuit connected to the speed sensor circuit and responding to the tape speed signal for putting out a motor drive signal for delivery to a takeup side one of the drive motors for constant tape speed during tape travel in either direction;
   (f) first switching means for causing the motor drive signal to be applied to the first drive motor during tape travel in the reverse direction, and to the second drive motor during tape travel in the forward direction;
   (g) a tape tension control circuit for generating a tape tension signal in response to a tape reel diameter signal indicative of the increasing diameter of the tape reel on a takeup side one of the cassette hubs during tape travel in either direction, the tape tension signal increasing in magnitude with the increase in the diameter of the tape reel on the takeup side one of the cassette hubs;
   (h) second switching means connected between the tape tension control circuit and the first and second drive motors for applying the tape tension signal to the first drive motor during tape travel in the forward direction and to the second drive motor during tape travel in the reverse direction, either of the first and second drive motors when applied with the tape tension signal of increasing magnitude being effective to exert increasing tension on the tape; and
   (i) a reverse tape tension drop circuit connected to the tape tension control circuit for making the tape tension signal smaller in magnitude during reverse tape travel than during forward tape travel under the condition of the same tape reel diameter on a takeup side one of the cassette hubs;
   (j) whereby the tape tension is rendered approximately the same at the magnetic head during forward and reverse tape travels under the condition of the same tape reel diameter on a takeup side one of the cassette hubs, in the face of the dynamically asymmetrical tape path due to the offset arrangement of the speed sensing roller in frictional engagement therewith.

2. The magnetic tape cassette apparatus as recited in claim 1, wherein the tape tension control circuit is connected to the motor drive circuit to utilize the motor drive signal as the tape reel diameter signal.

3. The magnetic tape cassette apparatus as recited in claim 1, wherein the first switching means comprises a first switching transistor connected between the first drive motor and ground, and a second switching transistor connected between the second drive motor and the ground.

4. The magnetic tape cassette apparatus as recited in claim 1, wherein the tape tension control circuit comprises:
   (a) a resistor;
   (b) a source of a reference signal;
   (c) a differential amplifier having a first input connected to the motor drive circuit via the resistor, and a second input connected to the reference signal source; and
   (d) a tape tension control transistor for controlling the magnitude of the tape tension signal according to the output from the differential amplifier.

5. The magnetic tape cassette apparatus as recited in claim 4, wherein the reverse tape tension drop circuit is adapted to change the magnitude of either of the two input signals of the differential amplifier of the tape tension control circuit to a predetermined degree depending upon whether the tape is traveling in the forward or reverse direction.

6. The magnetic tape cassette apparatus as recited in claim 5, wherein the reverse tape tension drop circuit comprises:
   (a) a second resistor; and
   (b) a reverse tape tension drop transistor connected between one of the two inputs of the differential amplifier of the tape tension control circuit and ground via the second resistor.

7. The magnetic tape cassette apparatus as recited in claim 4, wherein the second switching means comprises a switching diode circuit for grounding either of the first and second drive motors via the tape tension control transistor depending upon the direction of tape travel.

* * * * *